(12) United States Patent
Schmitt (10) Patent No.: US 6,318,598 B1
(45) Date of Patent: Nov. 20, 2001

(54) LIQUID STORING AND DISPENSING UNIT

(76) Inventor: Anthony L. Schmitt, 25982 81$^{st}$ Ave., St. Cloud, MN (US) 56301

( * ) Notice: Subject to any disclaimer, the term of this patent is extended or adjusted under 35 U.S.C. 154(b) by 0 days.

(21) Appl. No.: 09/657,840

(22) Filed: Sep. 8, 2000

Related U.S. Application Data (63) Continuation-in-part of application No. 09/275,865, filed on Mar. 25, 1999, now Pat. No. 6,135,324.
(60) Provisional application No. 60/083,683, filed on Apr. 30, 1998.

(51) Int. Cl.$^7$ .................................................. B67D 5/60
(52) U.S. Cl. ................................. 222/143; 222/185.1
(58) Field of Search ...................... 222/129, 143, 222/185.1

(56) References Cited

U.S. PATENT DOCUMENTS

| | | | |
|---|---|---|---|
| 2,457,842 | * 1/1949 | Smith et al. | 220/1.5 |
| 3,955,715 | * 5/1976 | Topor | 222/143 |
| 4,648,521 | 3/1987 | Thomas et al. | 220/1.5 |
| 4,838,443 | 6/1989 | Cripe et al. | 220/1.5 |
| 4,887,731 | 12/1989 | Pett et al. | 220/1.5 |
| 5,156,268 | 10/1992 | Nichols | 206/386 |
| 5,199,570 | 4/1993 | McKenzie | 206/503 |
| 5,201,432 | 4/1993 | Elvin-Jensen | 220/1.5 |
| 5,249,684 | 10/1993 | Sterett | 206/503 |
| 5,307,956 | * 5/1994 | Richter et al. | 222/143 |
| 5,501,334 | 3/1996 | Przytulla et al. | 206/386 |
| 5,645,185 | 7/1997 | Cassina | 220/1.5 |
| 6,135,324 | * 10/2000 | Schmitt | 222/143 |

* cited by examiner

Primary Examiner—Joseph A. Kaufman (57) ABSTRACT

A stackable container for storing and dispensing a liquid has upright walls, a top wall and a bottom wall providing a chamber for storing a liquid. Adjacent upright walls are joined to corners. One corner has a bottom portion located above the plane of the bottom wall providing a space below the one corner. The top wall has a fill opening at the top of the one corner. An ON-OFF valve attached to a lower portion of the upright wall of the container is used to drain liquid from the container. A modified stackable combined container and pallet for storing and dispensing a liquid has upright walls, a top wall and a bottom wall providing a chamber for storing a liquid. Adjacent upright walls are joined to corners. One corner of the pallet has an inwardly curved recess to provide a space below the one corner of the container. The top wall of the container has a fill opening at the top of the one corner. An ON-OFF valve attached to a lower portion of the upright wall of the container is used to drain liquid from the container.

10 Claims, 12 Drawing Sheets

LIQUID STORING AND DISPENSING UNIT

RELATED APPLICATIONS

This application is a continuation-in-part of U.S. Ser. No. 09/275,865 filed Mar. 25, 1999 now U.S. Pat. No. 6,135,324 which is a continuation of U.S. Provisional Patent Application Serial No. 60/083,683 filed Apr. 30, 1998.

FIELD OF THE INVENTION

The invention is in the field of stackable containers for storage and dispensing of bulk liquid, such as lubricants.

BACKGROUND OF THE INVENTION

Previously 55-gallon drums have been used to store bulk liquids and fluid materials. The drums are cylindrical members having generally flat top and bottom walls. The top has an opening. A pump mounted on the top is used to pump the fluid out of the drum. Leaks and spills create messy drum tops and drum storage areas. Also, transferring the pump from one drum to another drum allows dripping of fluid from the pump. The drums cannot be stacked on top of each other which takes up space.

SUMMARY OF THE INVENTION

The invention is a stackable container for storing and dispensing of liquid in bulk quantities, such as lubricants. The container has upright walls joined to top and bottom walls to form a chamber accommodating a liquid. Adjacent upright walls are joined to corners that extend between the top and bottom walls. One corner has a bottom portion located above the bottom of the container to provide a space below the corner. A fill opening closed with a cap is formed in the top wall at the top of the one corner. When a first container is stacked on top of a second container the space below the corner is above the fill opening of the second container. Liquid can be placed in the first and second containers without separating the containers as the space allows the cap to be removed from the second container and permits liquid to be poured through the fill opening into the chamber. The upright walls have upright parallel ribs to increase the strength of the walls and enhance the appearance of the container.

The stacked containers are maintained in alignment with each other with complementary ribs and grooves in the top and bottom walls. The top wall has a plurality of linear ribs. Grooves in the bottom wall complement the size and shape of the ribs so that identical containers nested together have mating ribs and grooves that prevent relative movement between the stacked containers. A conventional ON-OFF drain valve attached to the bottom of one side wall is used to drain liquid from the chamber. The bottom of the side wall can have a recess of a size to accommodate the drain valve.

A modification of the invention is a stackable combined container and pallet for storing and dispensing of liquid in bulk quantities, such as lubricants. The container has upright walls joined to top and bottom walls to form a chamber accommodating a liquid. Adjacent upright walls are joined to corners that extend between the top and bottom walls. A pallet accommodates the bottom of the container. The pallet spaces the bottom of the container above the support surface. The bottom of the pallet has a pair of transversely spaced recesses or pockets to accommodate the tines of a forklift machine. One corner of the pallet has a concave curved recess to provide a space below a corner of the bottom of the container. A fill opening closed with a cap is formed in the top wall at the top of one corner of the container. When a first container and pallet are stacked on top of a second container the bottom wall of the first container is spaced above the fill opening of the second container. Liquid can be placed in the first and second containers without separating the containers and pallets as the space allows the cap to be removed from the second container and permits liquid to be poured through the fill opening into the chamber. The upright walls have upright parallel ribs to increase the strength of the walls and enhance the appearance of the container.

The stacked containers and pallets are maintained in alignment with each other with complementary ribs and grooves in the top wall of the container and the bottom wall of an adjacent pallet. The top wall has a plurality of linear ribs. Grooves in the bottom wall of the pallet complement the size and shape of the ribs of the container so that identical containers and pallets nested together have mating ribs and grooves that prevent relative movement between the stacked containers and pallets. A conventional ON-OFF drain valve attached to the bottom of one side wall is used to drain liquid from the chamber. The bottom of the container side wall has a recess of a size to accommodate the drain valve.

DESCRIPTION OF PREFERRED EMBODIMENTS OF THE LIQUID STORAGE AND DISPENSING UNITS

Figure 1:
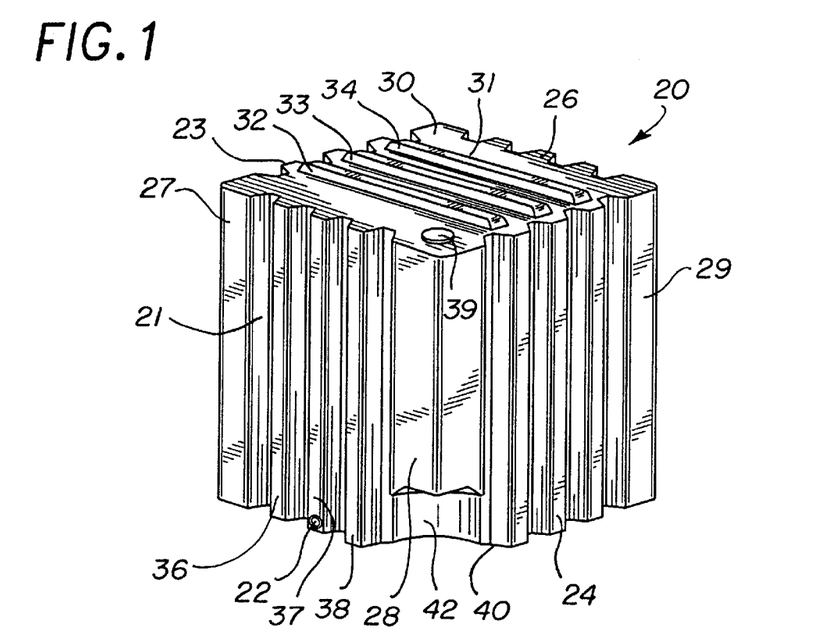
FIG. 1 is a perspective view of a liquid storage and dispensing unit of the invention.
Figure 2:
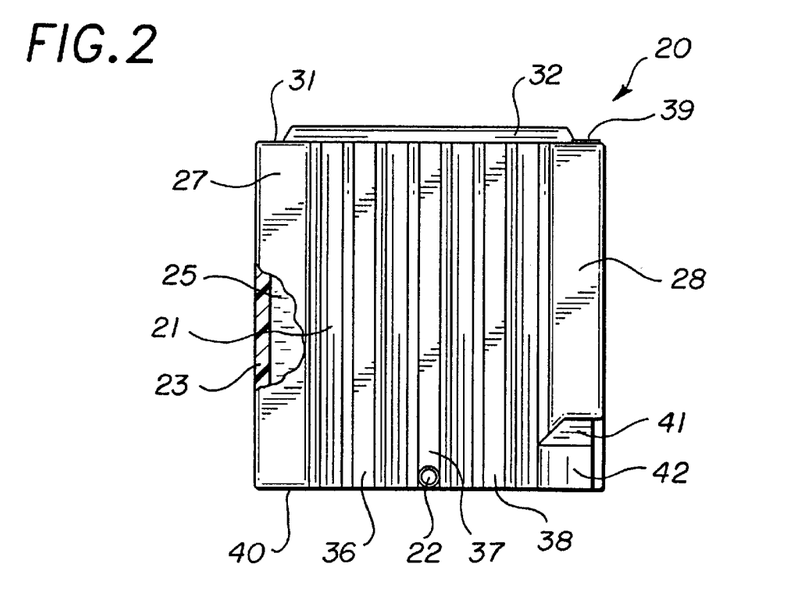
FIG. 2 is a partly sectional front elevational view thereof.
Figure 3:
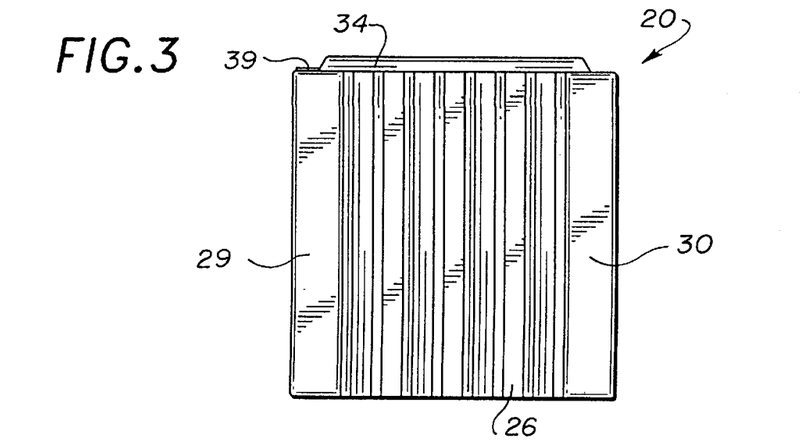
FIG. 3 is a rear elevational view thereof.
Figure 4:
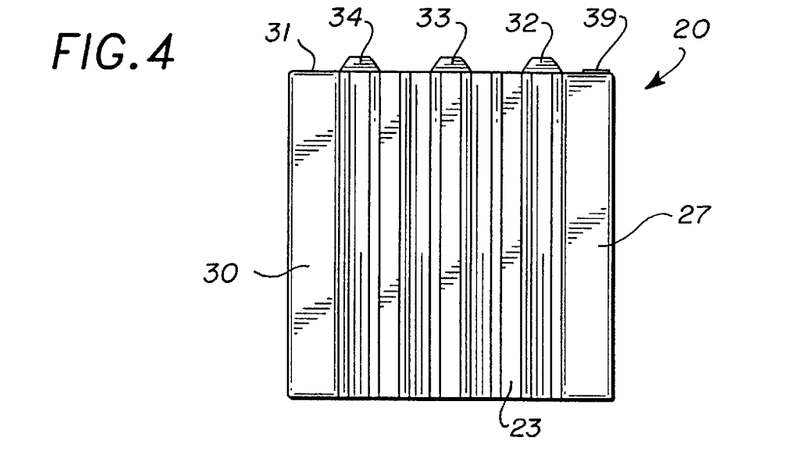
FIG. 4 is a side elevational view of the left side of FIG. 1.
Figure 5:
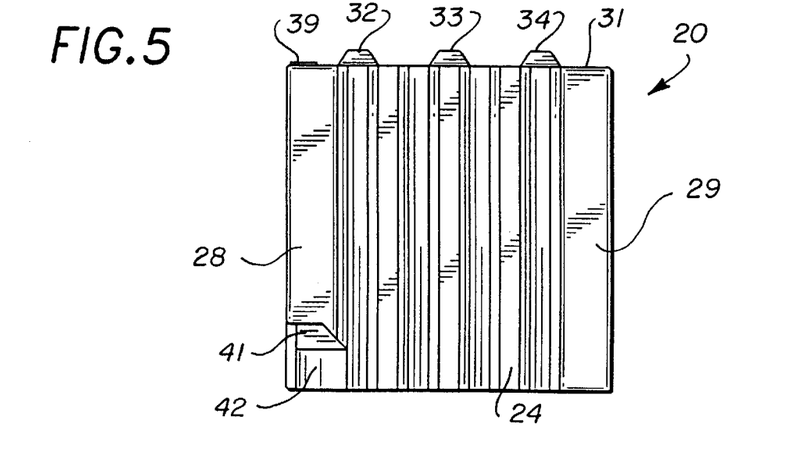
FIG. 5 is a side elevational view of the right side of FIG. 1.

Referring to FIGS. 1 and 2, liquid storage and dispensing unit 20 is a cube-shaped tank or container for storing liquid, such as bulk motor oil, anti-freeze and grease. Unit 20 has an upright front wall 21 joined to upright side walls 23 and 24, a back wall 26 and top and bottom walls 31 and 40. These walls enclose a chamber 25 for holding a liquid. Unit 20 is a one-piece container made of plastic, such as polyethylene, by a rotational molding process. The plastic is compatible with the liquid in chamber 25. Square upright corners 27, 28, 29 and 30 are located at adjacent vertical portions of walls 21, 23, 24 and 26. Each wall 21, 23, 24 and 26 has three vertical ribs 36, 37 and 38 that extend from the bottom to the top of unit 20. Each rib 36, 37 and 38 has outwardly converging or tapered sides and a flat face joined to the sides. The ribs are corrugations that increase the strength of the walls and provide unit 20 with a novel appearance. The faces of the ribs are located in the planes of the outside walls of adjacent corners.

Figure 6:
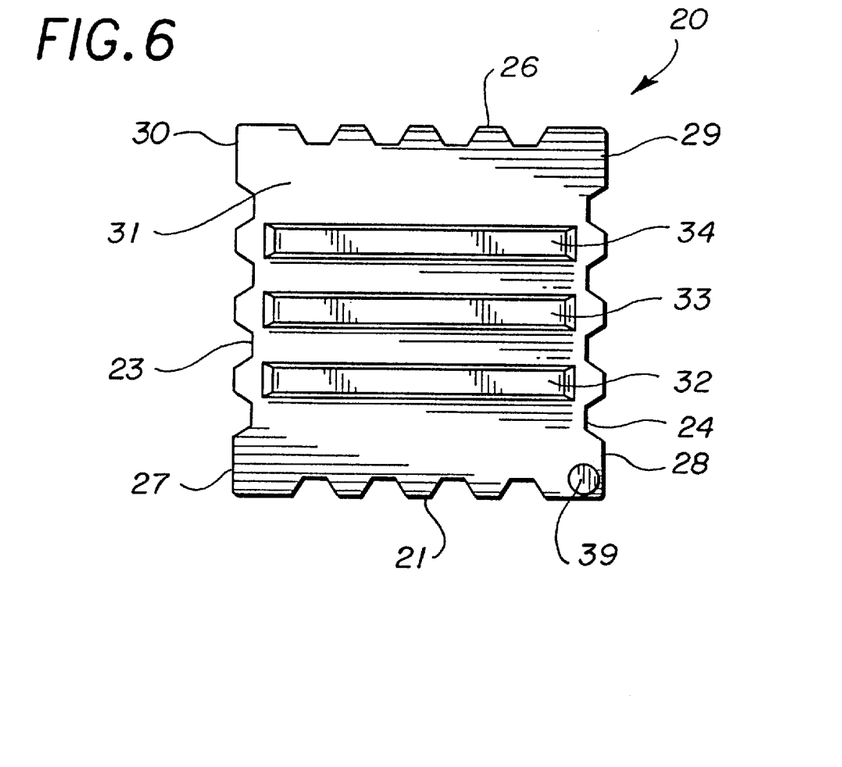
FIG. 6 is a top plan view thereof.
Figure 7:
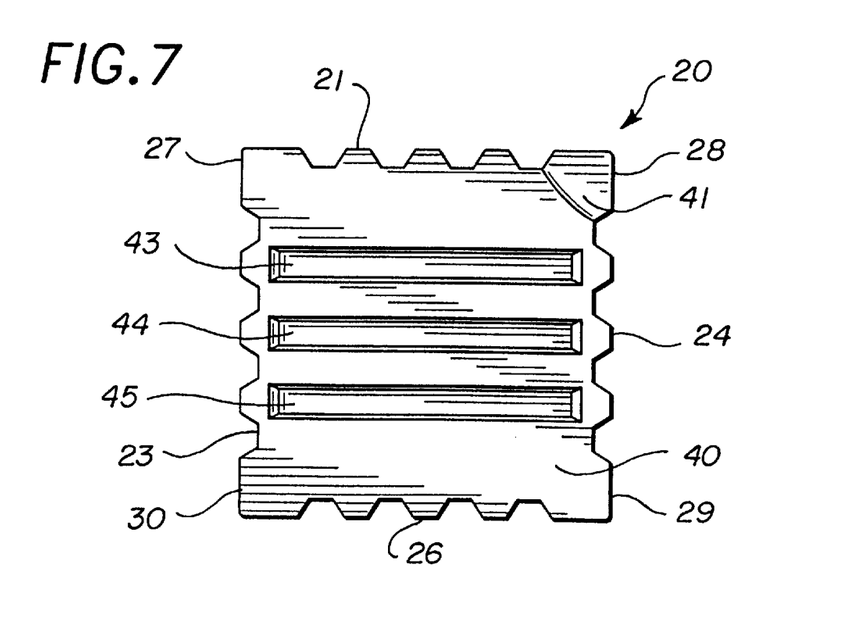
FIG. 7 is a bottom plan view thereof.
Figure 15:
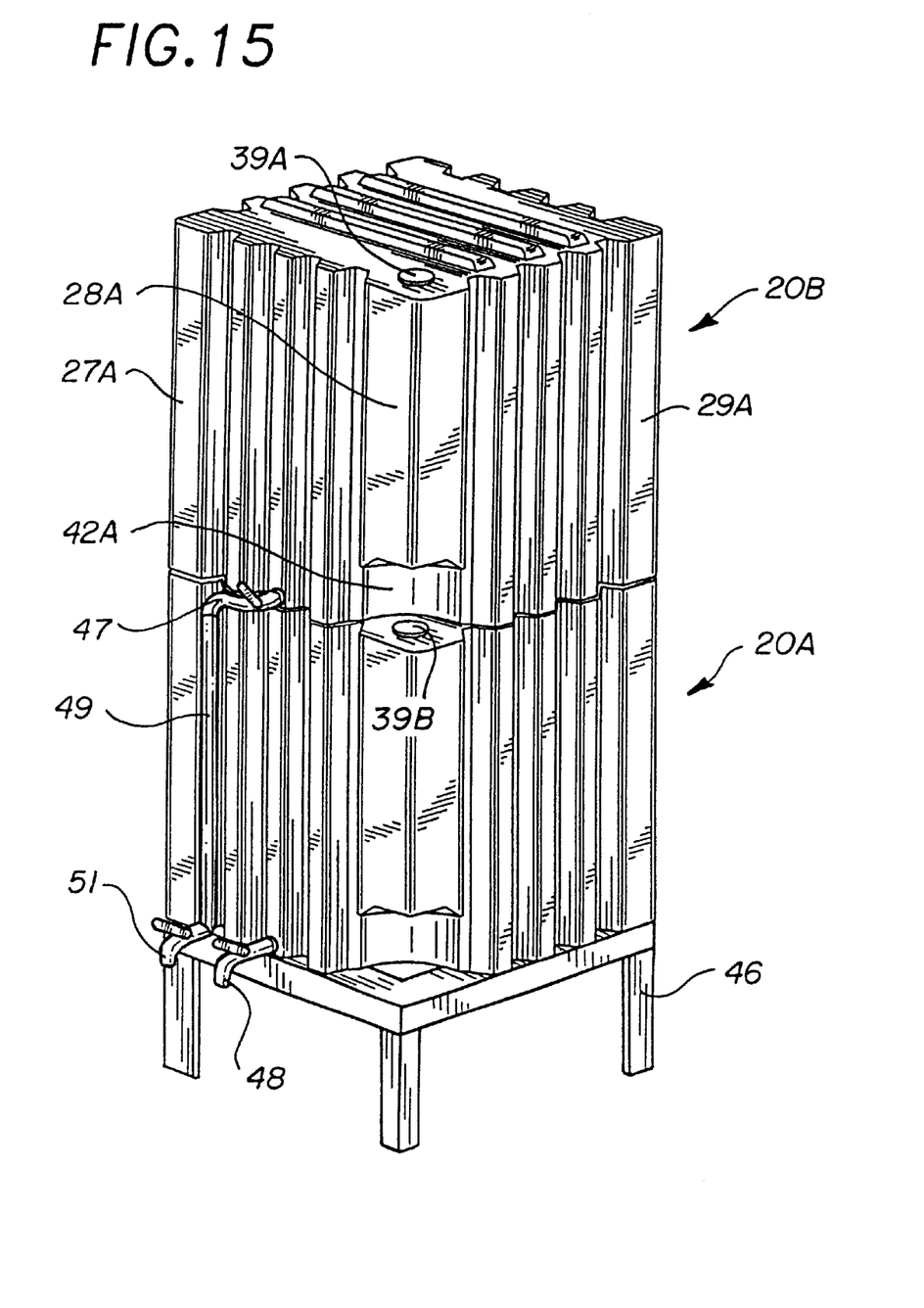
FIG. 15 is a perspective view of a pair of stacked liquid storing and dispensing unites of FIG. 1.

As shown in FIG. 6, top wall 31 has three linear ribs 32, 33 and 34 that project upwardly from top wall 31. The opposite ends of each rib are located inwardly from side walls 23 and 24. Bottom wall 40, shown in FIG. 7, has three linear grooves 43, 44 and 45 that are complementary in shape and length to ribs 32, 33 and 34. Grooves 43, 44 and 45 are linear recesses of inwardly directed ribs in bottom wall 40. The ribs 32, 33 and 34 increase the strength of top wall 31 and provide keys which mate with grooves in another unit placed on top of unit 20. As shown in FIG. 15, several units 20A and 20B are stackable in an aligned and fixed orientation. The mating ribs 32, 33, 34 and grooves 43, 44, 45 prevent relative lateral movement between the top and bottom units. A stand 46 having a square frame and downwardly directed legs supports the bottom unit 20A above a support surface or floor. A conventional ON-OFF drain valve 48 is secured to unit 20A in communication with opening 22. An ON-OFF drain valve 47 mounted on the bottom of the front wall of top unit 20B is used to control the flow of liquid from unit 20B into a hose 49. Hose 49 extends from valve 47 down adjacent unit 20A to platform 46. Another ON-OFF valve 51 attached to the lower end of hose 49 allows a person to fill a container with liquid with the container resting on the floor adjacent platform 46. Valves 47 and 48 can be connected with hoses to a pump used to dispense liquid to a remote location, such as a motor vehicle lube station. A conventional drain valve is shown in U.S. Pat. No. 5,259,509. Wall 21 can have a recess of a size to accommodate the drain valve.

The top of corner 28 has a fill opening normally closed with a cap 39. When cap 39 is removed liquid can be placed in chamber 25 via the opening in the top wall above corner 28. Corner 28 has an inclined bottom wall 41 located above the horizontal plane of bottom wall 40 to provide a space 42 adjacent the bottom of corner 28. As shown in FIG. 15, when two units 20A and 20B are in stacked relation, space 42A is above fill cap 39B. The space 42A allows fill cap 39B to be removed so that liquid can be placed in chamber 25 without altering the stack relationship of units 20A and 20B.

The parts of liquid storage and dispensing unit 120 shown in FIGS. 8 to 14 and 16 that correspond to liquid storage and dispensing unit 20 have the same reference numbers with a prefix 1.

Figure 8:
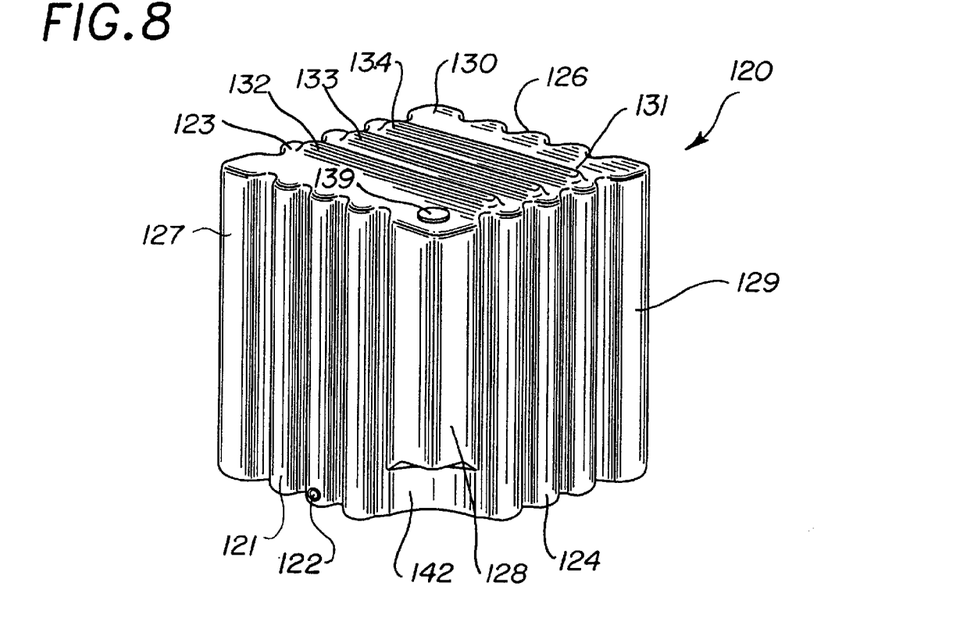
FIG. 8 is a perspective view of a first modification of the liquid storage and dispensing unit of FIG. 1.
Figure 9:
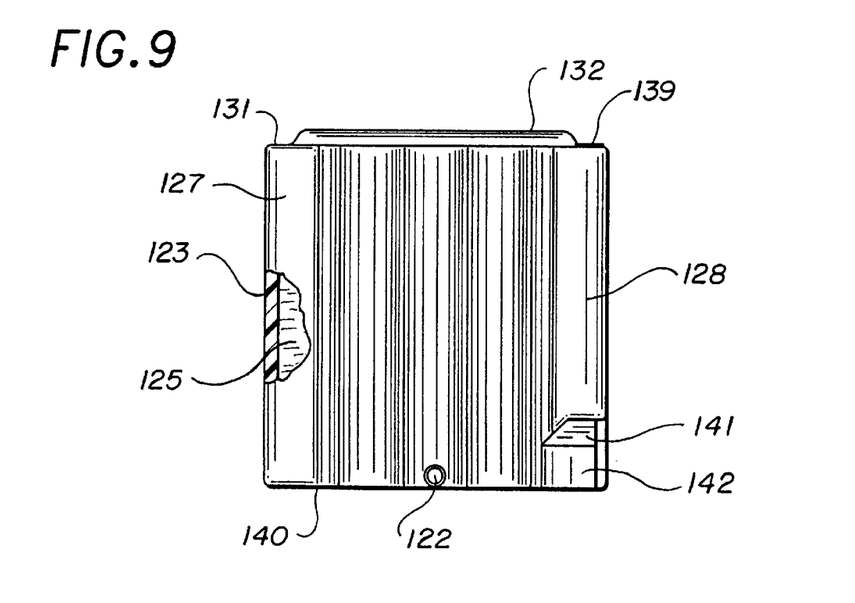
FIG. 9 is a partly sectional front elevational view of FIG. 8.
Figure 10:
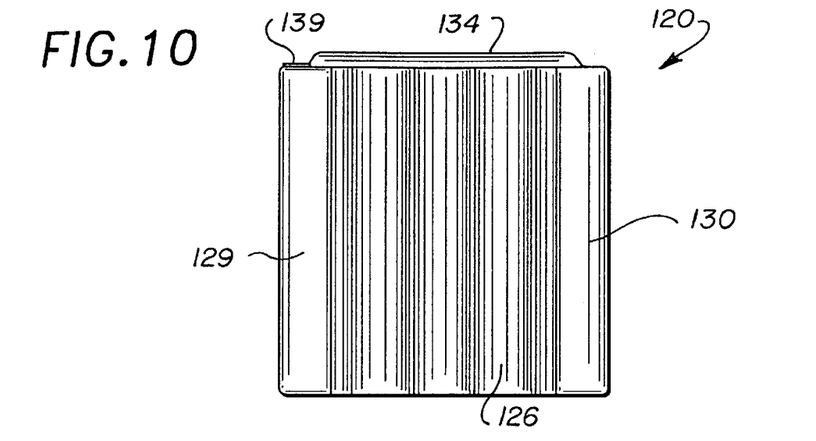
FIG. 10 is a rear elevational view of FIG. 8.
Figure 11:
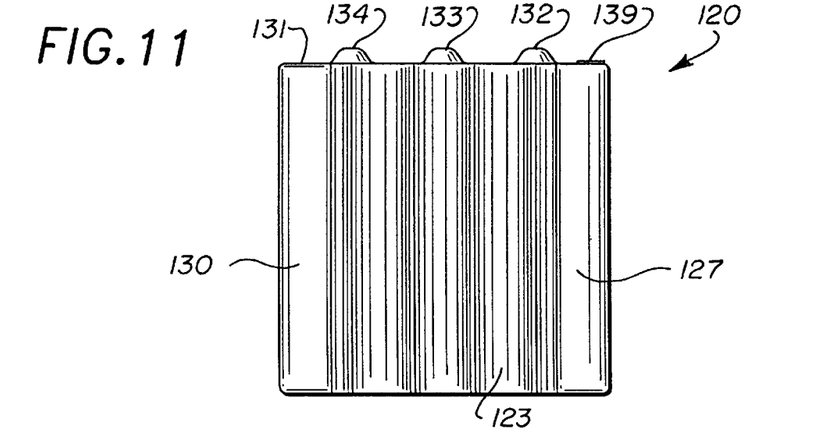
FIG. 11 is a side elevational view of the left side of FIG. 8.
Figure 12:
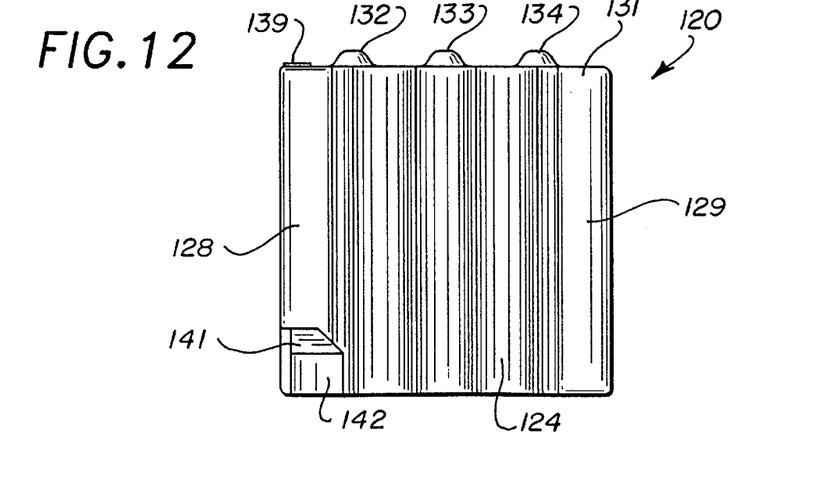
FIG. 12 is a side elevational view of the right side of FIG. 8.

Referring to FIGS. 8 and 9, liquid storage and dispensing unit 120 is a cube-shaped tank or container for storing liquid, such as bulk motor oil, anti-freeze and grease. Unit 120 has an upright front wall 121 joined to upright side walls 123 and 124, a back wall 126 and top and bottom walls 131 and 140. These walls enclose a chamber 125 for holding a liquid. Unit 120 is a one-piece container made of plastic, such as polyethylene, by a rotational molding process. The plastic is compatible with the liquid in chamber 125. Round upright corners 127, 128, 129 and 130 are located at adjacent vertical portions of walls 121, 123, 124 and 126. The round corners have uniform wall thickness and curved outer surfaces which enhance the appearance of unit 120 and eliminate abrupt edges. Each wall 121, 123, 124 and 126 has three vertical ribs 136, 137 and 138 that extend from the bottom to the top of unit 120. Each rib 136, 137 and 138 has a rounded generally semi-circular shaped cross section. The ribs are wave corrugations that increase the strength of the walls and provide unit 120 with a smooth and novel appearance. The outer portions of the ribs are located in the planes of the outside walls of adjacent corners. The side wall portions providing the spaces between adjacent ribs have concave shapes. The front, side and end walls have wave configurations with smooth surfaces.

Figure 13:
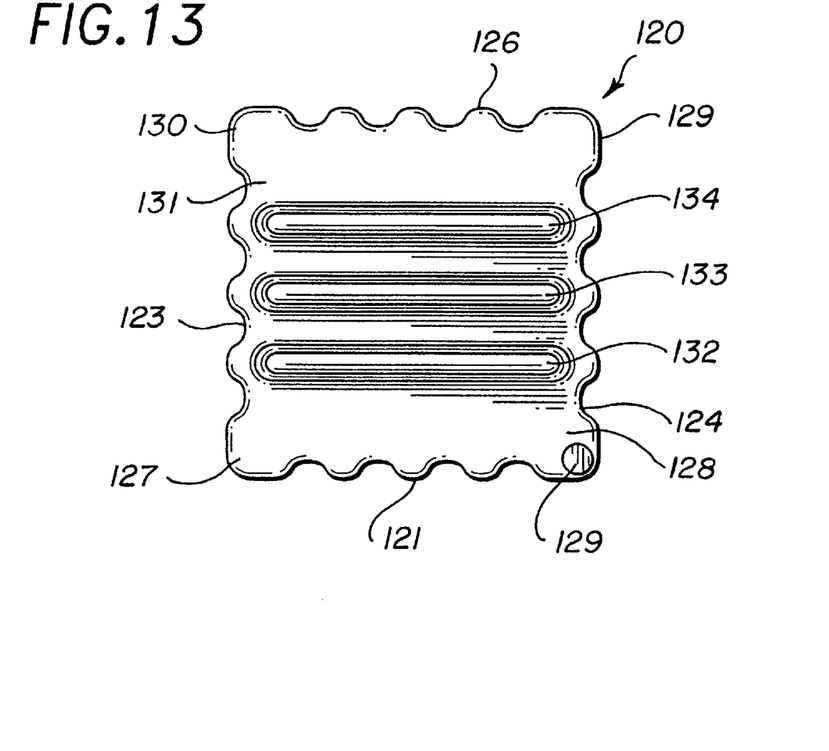
FIG. 13 is a top plan view of FIG. 8.
Figure 14:
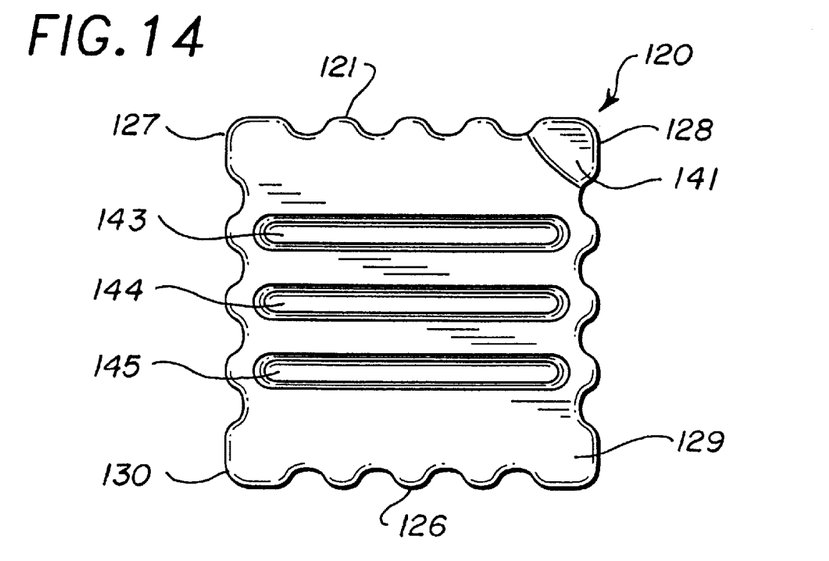
FIG. 14 is a bottom plan view of FIG. 8.
Figure 16:
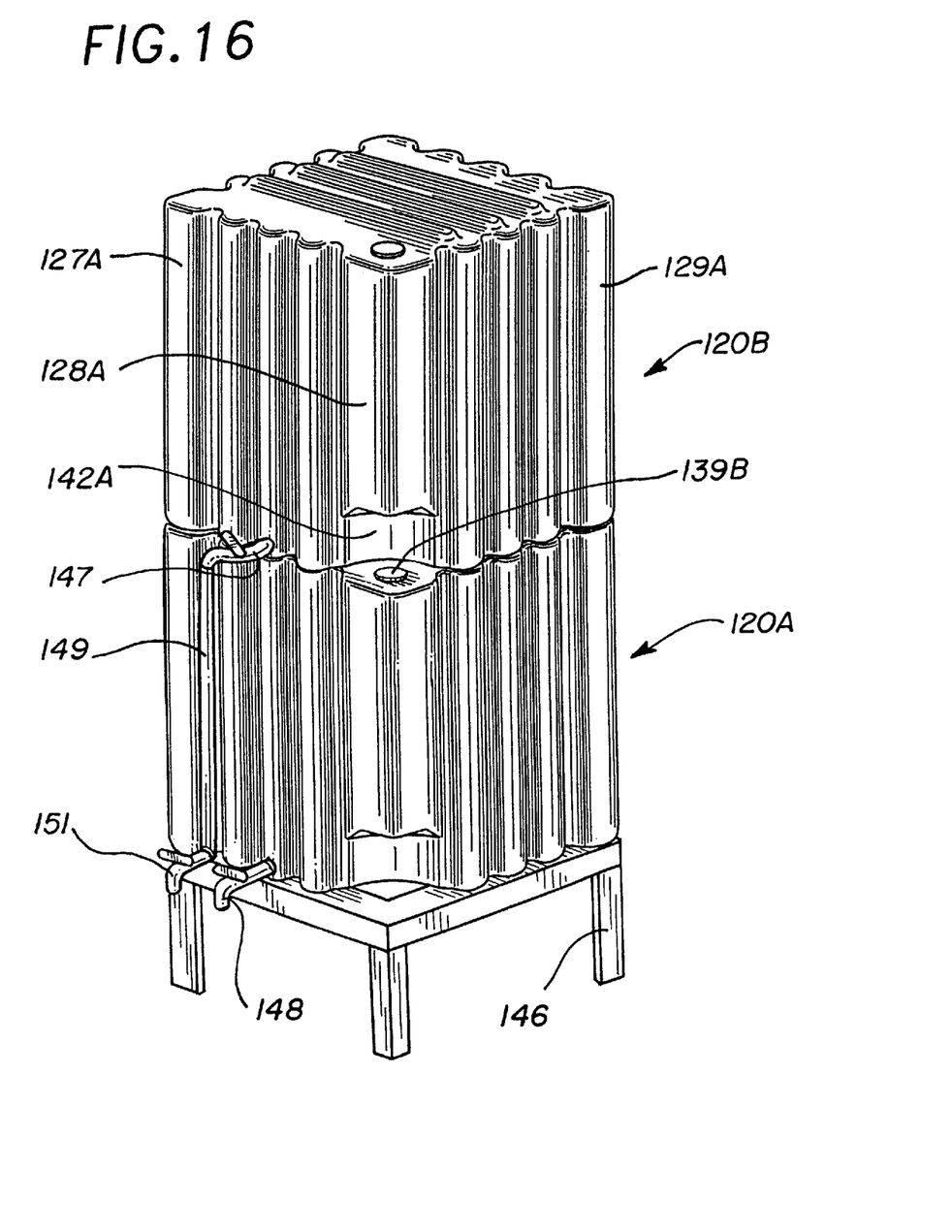
FIG. 16 is a perspective view of a pair of stacked liquid storing and dispensing units of FIG. 8.
Figure 17:
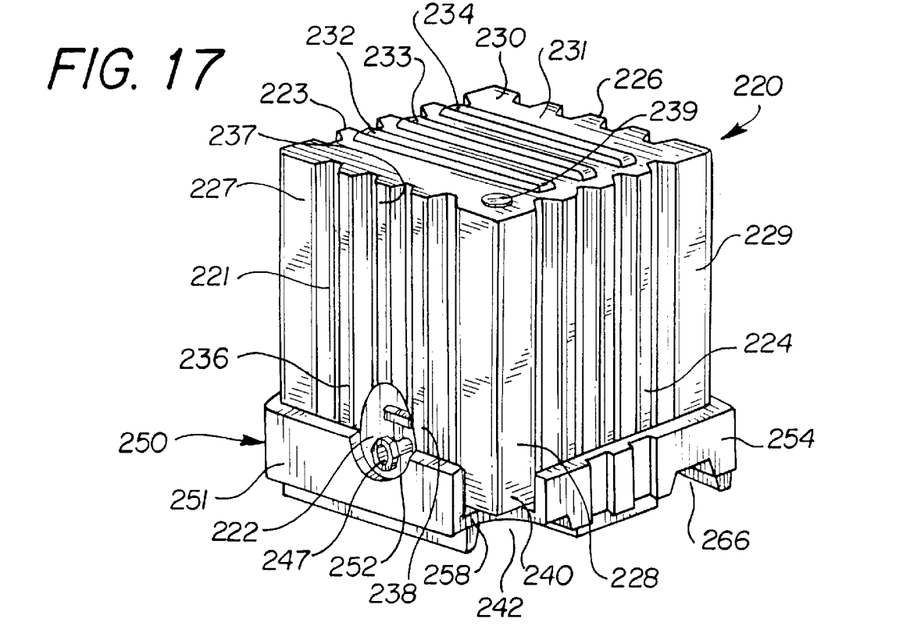
FIG. 17 is a perspective view of a second modification of the liquid storage and dispensing unit and pallet of the invention.
Figure 18:
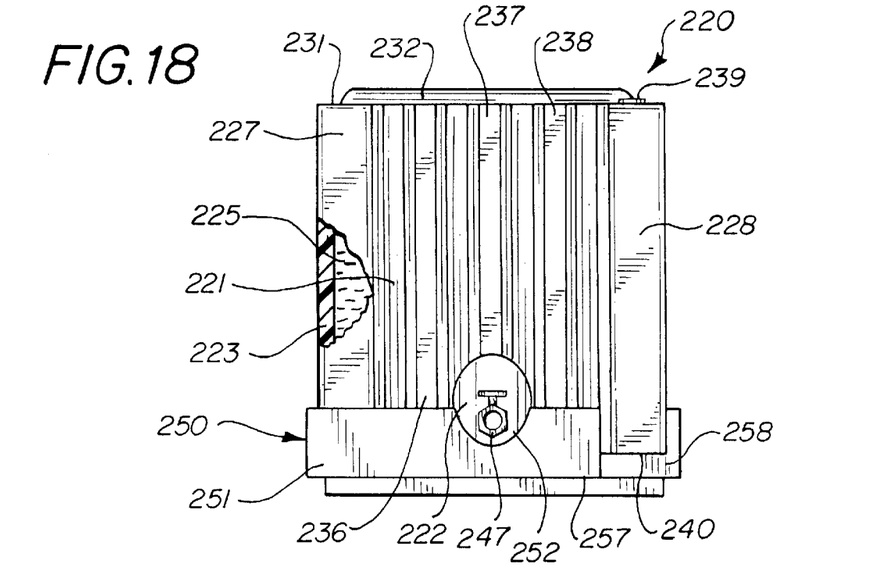
FIG. 18 is a partly sectional front elevational view of FIG. 17.
Figure 19:
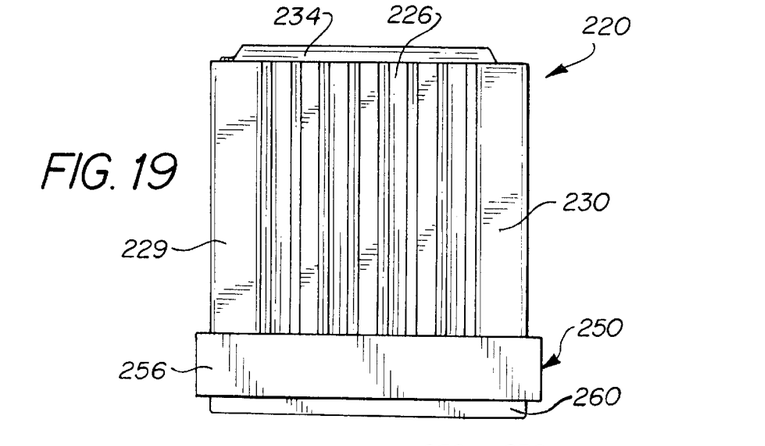
FIG. 19 is a rear elevational view of FIG. 17.
Figure 20:
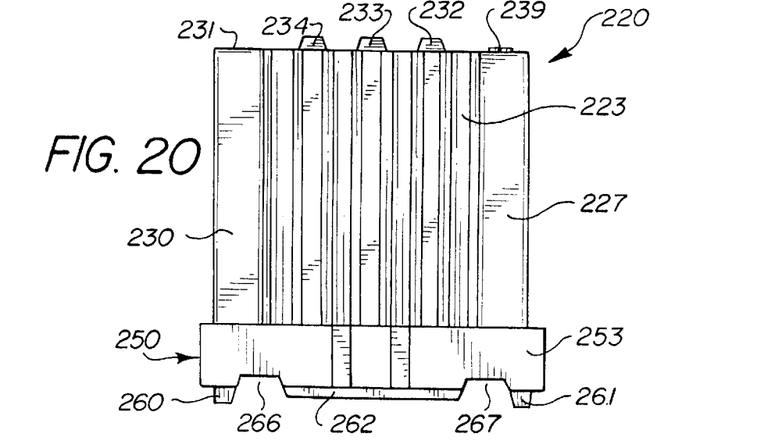
FIG. 20 is a side elevational view of the left side of FIG. 17.
Figure 21:
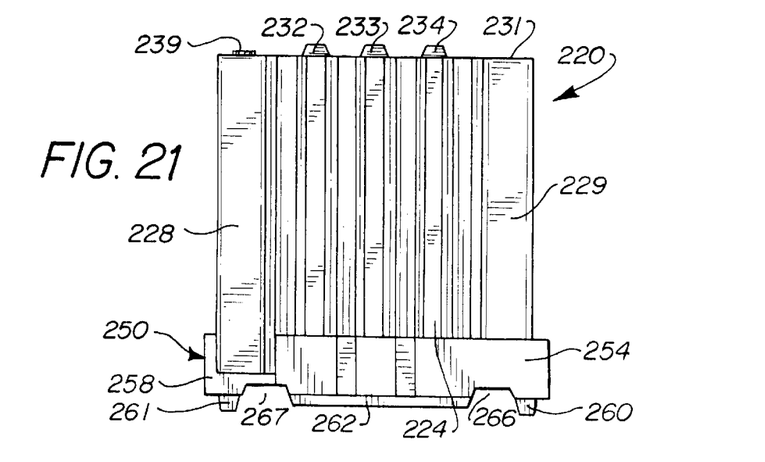
FIG. 21 is a side elevational view of the right side of FIG. 17.

As shown in FIG. 13, top wall 131 has three linear ribs 132, 133 and 134 that project upwardly from top wall 131. The opposite ends of each rib are located inwardly from side walls 123 and 124. Bottom wall 140, shown in FIG. 14, has three linear grooves 143, 144 and 145 that are complementary in shape and length to ribs 132, 133 and 134. Grooves 143, 144 and 145 are linear recesses of inwardly directed ribs in bottom wall 140. The ribs 132, 133 and 134 increase the strength of top wall 131 and provide keys which mate with grooves in another unit placed on top of unit 120. As shown in FIG. 16, several units 120A and 120B are stackable in an aligned and fixed orientation. The mating ribs and grooves prevent relative movement between the top and bottom units. A stand 146 having a frame and downwardly extended legs supports the bottom unit 120A above a support surface or floor. A conventional ON-OFF drain valve 148 is secured to unit 120A in communication with opening 122. An ON-OFF drain valve 147 mounted on the bottom of the front wall of top unit 120B is used to control the flow of liquid from top unit 120B into a hose 149. The hose 149 extends from valve 147 down adjacent unit 120A to platform 146. Another ON-OFF valve 151 attached to the lower end of hose 149 allows a person to fill a container resting on the floor below valve 151 with liquid. Valves 147 and 148 can be connected with hoses to a pump operable to deliver liquid under pressure to a remote location, such as a motor vehicle lube station. A conventional drain valve is shown in U.S. Pat. No. 5,259,509. Wall 121 can have a recess of a size to accommodate the drain valve.

The top of corner 128 has a fill opening normally closed with a cap 139. When cap 139 is removed liquid can be placed in chamber 125 via the opening in the top wall above corner 128. Corner 128 has an inclined bottom wall 141 located above the horizontal plane of bottom wall 140 to provide a space 142 adjacent the bottom of corner 128. As shown in FIG. 16, when two unites 120A and 120B are in stacked relation, space 142A is above fill cap 139B. The space 142A allows fill cap 139B to be removed so that liquid can be placed in chamber 125 without altering the stack relationship of units 120A and 120B.

Referring to FIGS. 17 to 21, the combined container and pallet of the invention has a cube-shaped tank or container 220 for storing liquid, such as syrups, juices, bulk motor oil, anti-freeze and grease and a pan-shaped pallet or platform 250 for handling, supporting and moving tank 220. Tank 220 has an upright front wall 221 joined to upright side walls 223 and 224, a back wall 226 and top and bottom walls 231 and 240. These walls enclose a chamber 225 for holding a liquid. Tank 220 is a one-piece container made of plastic, such as polyethylene, by a rotational molding process. The plastic is compatible with the liquid in chamber 225. Square upright corners 227, 228, 229 and 230 are located at adjacent vertical portions of walls 221, 223, 224 and 126. Tank 220 can have round upright corners which enhance the novel appearance of tank 220 and eliminate abrupt edges. Each wall 221, 223, 224 and 226 has three vertical ribs 236, 237 and 238 that extend from the bottom to the top of tank 220. Each rib 236, 237 and 238 has outwardly converging or tapered sides and a flat face joined to the sides. The ribs are corrugations that increase the strength of the walls and provide tank 220 with a novel appearance. The faces of the ribs are located in the planes of the outside walls of adjacent corners. The top of corner 228 has a fill opening normally closed with a cap 239. When cap 239 is removed liquid can be placed in chamber 225 via the opening in the top wall above corner 228. A conventional ON-OFF drain valve 247 mounted on the bottom of front wall 221 is used to control the flow of liquid from container 220. Wall has a recess 222 to accommodate valve 247.

Figure 24:
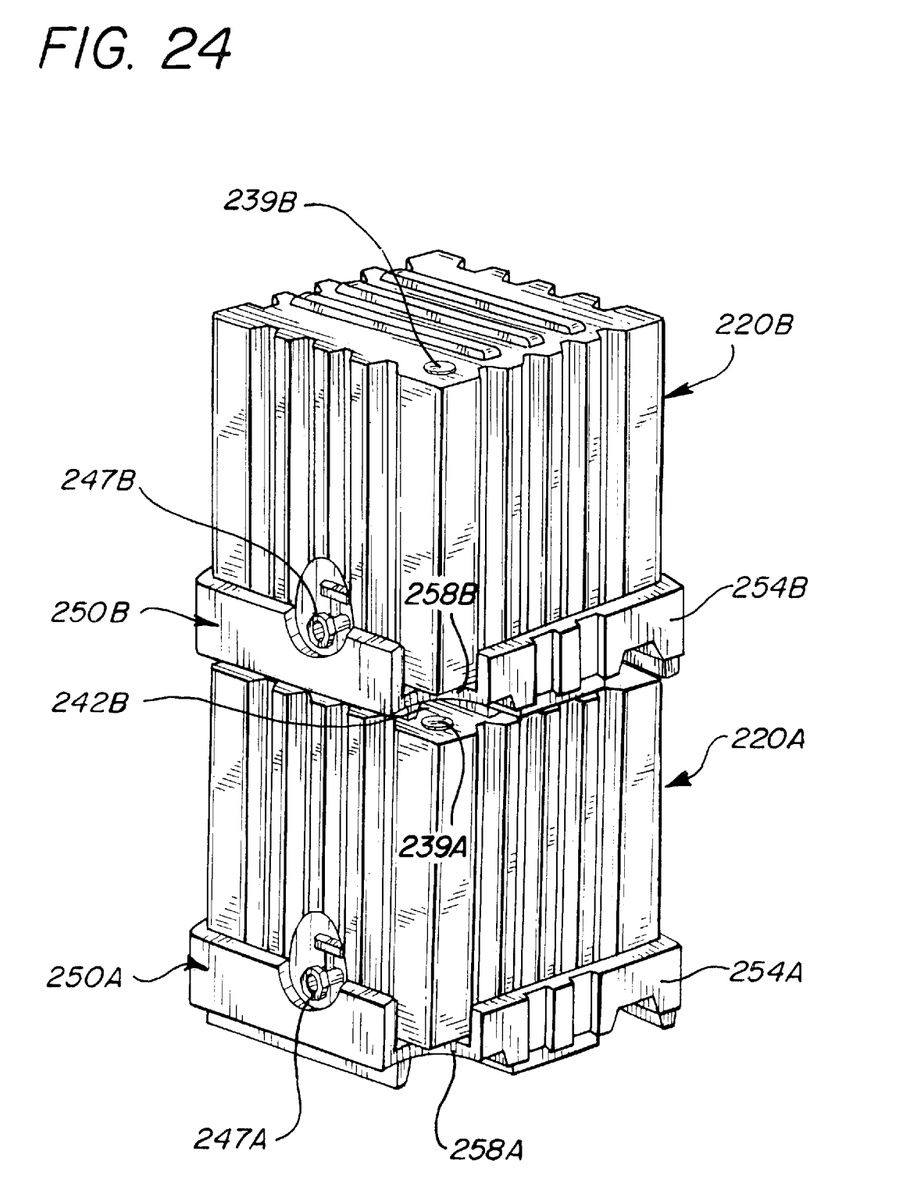
FIG. 24 is a perspective view of a pair of stacked liquid storing and dispensing unites and pallets of FIG. 17.

Pallet 250 has an upright front wall 251 joined to upright side walls 253 and 254, a back wall 256 and a bottom wall 257. Walls 251, 253, 254, 256 and 257 define a panshaped recess for accommodating the bottom portion of container 220. Front wall 251 has a downwardly extended groove to accommodate valve 247. The faces of container ribs 236 to 238 and the outside walls of corners 227, 229 and 230 of container 220 are located immediately adjacent the inner portions of pallet walls 251, 253, 254 and 256 to prevent relative lateral movement between container 220 and pallet 250, as seem in FIG. 22. The front corner of pallet 250 has an inwardly curved wall 258 located inwardly from the bottom of corner 238 to provide a space adjacent the bottom of corner 228. As shown in FIG. 24, when two containers 220A and 220B and pallets 250A and 250B are in stacked relation, space 242B is above fill cap 239A. The space 242A allows fill cap 239A to be removed so that liquid can be placed in the chamber of container 220A without altering the stacked relationship of containers 220A and 220B and pallets 250A and 250B.

Figure 22:
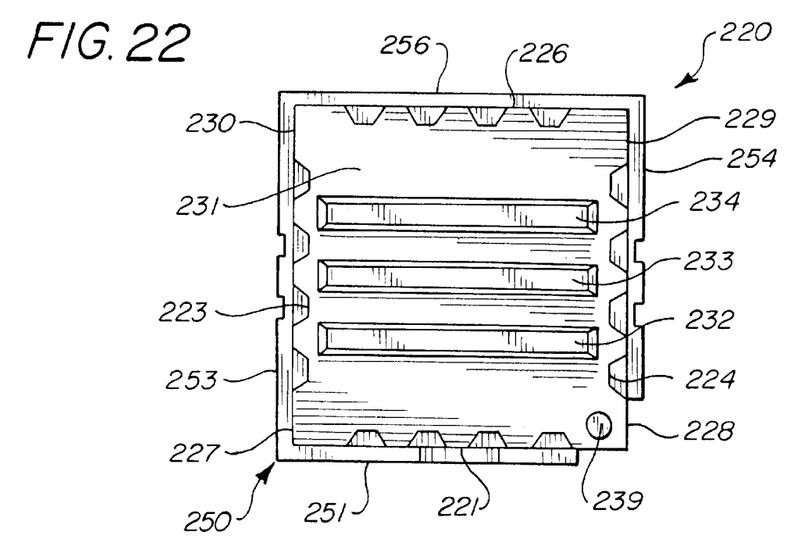
FIG. 22 is a top plan view of FIG. 17.
Figure 23:
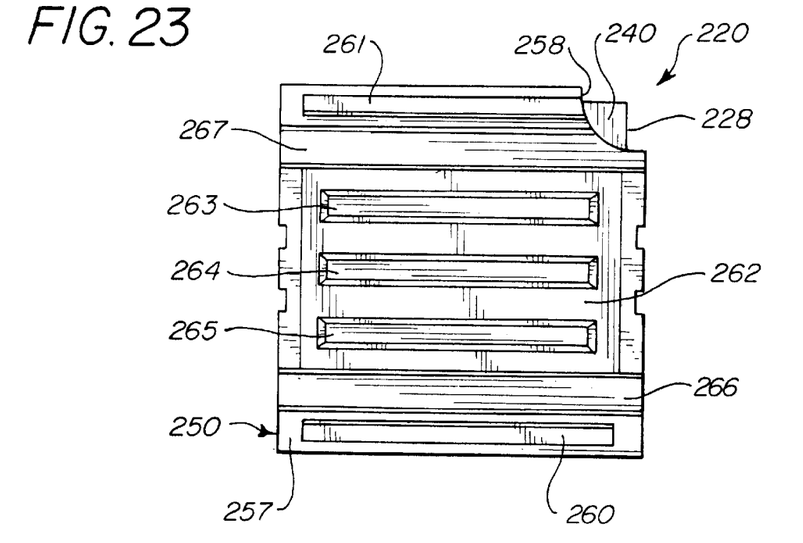
FIG. 23 is a bottom plan view of FIG. 17.

As shown in FIG. 22, top wall 231 of container 220 has three linear ribs 232, 233 and 234 that project upwardly from top wall 231. The opposite ends of each rib are located inwardly from side walls 223 and 224. Bottom wall 257 of pallet 250, shown in FIG. 23, has a base 262 which projects downwardly from bottom wall 257. Base 262 has three linear grooves 263, 264 and 265 that are complementary in shape and length to ribs 232, 233 and 234 of container top wall 231. Grooves 263, 264 and 265 are linear recesses of base 262. The ribs 232, 233 and 234 increase the strength of top wall 231 and provide keys which mate with grooves in another pallet placed on top of tank 220. Bottom wall 257 of pallet 250 has a pair of transversely spaced linear recesses or pockets 266 and 267 to receive the tines of a forklift device. A pair of linear legs 260 and 261 project downwardly from bottom wall 257. Legs 260 and 261 are located outwardly from pockets 266 and 267 and support pallet 250 above a support surface or above the top of another container in a stacked position below pallet 250. As shown in FIG. 24, several containers 220A and 220B and pallets 250A and 250B are stackable in an aligned and fixed orientation. The mating ribs 232, 233 and 234 and grooves 263, 264, 265 prevent relative lateral movement between the top and bottom containers and pallets. Pallet 250A supports the bottom container 220A above a support surface or floor. ON-OFF drain valves 247A and 247B mounted on the bottom of the front walls of containers 220A and 220B are used to control the flow of liquid from containers 220A and 220B. Valves 247A and 247B can be connected with hoses to pumps used to dispense liquid to a remote location, such as a motor vehicle lube station. A conventional drain valve is shown in U.S. Pat. No. 5,259,509. Walls 221A and 221B have recesses 222A and 222B to accommodate the drain valves 247A and 247B.

From the foregoing detailed description of the present invention it has been shown how the objects of the invention have been obtained in preferred manners. However, modifications and equivalents of the disclosed concepts, such as those which readily occur to those skilled in the art, are intended to be included within the scope of this invention. Thus, the scope of this invention is intended to be limited only by the scope of the claims which are, or which may hereinafter be, appended hereto.

What is claimed is:

1. Liquid storing and dispensing units comprising: a first container having an upright wall surrounding a chamber for storing a liquid, a bottom wall and a top wall joined to the upright wall, said upright wall having at least one corner, a liquid fill opening in the top wall adjacent said one corner, cap means attachable to the top wall to close the fill opening, and means for draining liquid from the chamber, a first pallet accommodating said bottom wall to support the first container, a second container having an upright wall surrounding a chamber for storing a liquid, a bottom wall and a top wall joined to the upright wall of the second container, said upright wall of the second container having at least one corner vertically aligned with the one corner of the first container, a liquid fill opening in the top wall of the second container to allow liquid to be placed in said chamber of the second container, cap means for closing the liquid fill opening of the second container, and means for draining liquid from the chamber of the second container, a second pallet supported on the top wall of the first container, said one corner of the second container having a bottom portion located above the top wall of the first container to provide a space between the first and second containers so that the first container can be filled with liquid using the fill opening of the first container without removing the second container from the first container.

2. The liquid storing and dispensing units of claim 1 wherein: said second pallet has a bottom wall located on the top wall of the first container, said bottom wall of the second pallet having a corner recess located below the one corner of the second container.

3. The liquid storing dispensing units of claim 1 wherein: said second pallet has a bottom wall located on the top wall of the first container, and an upright side wall surrounding the upright wall of the second container, said bottom wall and upright side wall of the second pallet having a common corner recess located adjacent the one corner of the second container.

4. The liquid storing dispensing units of claim 1 wherein: each of said first and second pallets have a bottom wall having a lower surface, and a pair of linear grooves in said lower surface to accommodate forks of a fork lift vehicle.

5. Liquid storing and dispensing units comprising: a first container having an upright wall surrounding a chamber for storing a liquid, a bottom wall and a top wall joined to the upright wall, said upright wall having at least one corner, a liquid fill opening in the top wall adjacent said one corner and cap means attachable to the top wall to close the fill opening, a first pallet accommodating said bottom wall of the first container to support the first container, a second container having an upright wall surrounding a chamber for storing a liquid, a bottom wall and a top wall joined to the upright wall of the second container, said upright wall of the second container having at least one corner vertically aligned with the one corner of the first container, a liquid fill opening in the top wall of the second container to allow liquid to be placed in said chamber of the second container and cap means for closing the liquid fill opening of the second container, a second pallet accommodating the bottom wall of the second container, said second pallet supported on the top wall of the first container, said one corner of the second container having a bottom portion located above the top wall of the first container to provide a space between the first and second container so that the first container can be filled with liquid using the fill opening of the first container without removing the second container from the first container.

6. The liquid storing and dispensing units of claim 5 wherein: said upright wall of each container has plurality of upright ribs.

7. The liquid storing and dispensing units of claim 5 wherein: the top wall of the first container has a plurality of ribs, and the bottom wall of the second pallet has a plurality of grooves having sizes and shapes that correspond to the sizes and shapes of the ribs whereby the ribs fit into the grooves to prevent lateral movement of the first and second containers relative to each other.

8. The liquid storing and dispensing units of claim 5 wherein: said second pallet has a bottom wall located on the top wall of the first container, said bottom wall of the second pallet having a corner recess located below the one corner of the second container.

9. The liquid storing dispensing units of claim 5 wherein: said second pallet has a bottom wall located on the top wall of the first container, and an upright side wall surrounding the upright wall of the second container, said bottom wall and upright side wall of the second pallet having a common corner recess located adjacent the one corner of the second container.

10. The liquid storing dispensing units of claim 5 wherein: each of said first and second pallets have a bottom wall having a lower surface, and a pair of linear grooves in said lower surface to accommodate forks of a fork lift vehicle.

* * * * *